United States Patent
Callicrate et al.

(10) Patent No.: US 8,429,536 B2
(45) Date of Patent: Apr. 23, 2013

(54) METHOD AND APPARATUS FOR PROVIDING A TILED MAP AND DISPLAY OBJECT LAYER OVER A NETWORK

(75) Inventors: Joel Callicrate, Columbia, MD (US); Matthew J Stine, Los Angeles, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 841 days.

(21) Appl. No.: 12/496,485

(22) Filed: Jul. 1, 2009

(65) Prior Publication Data

US 2011/0004828 A1    Jan. 6, 2011

(51) Int. Cl.
G06F 3/00    (2006.01)
G06F 3/048    (2006.01)

(52) U.S. Cl.
USPC ........... 715/738; 715/715; 715/763; 715/838; 715/851

(58) Field of Classification Search .................. 715/738, 715/838, 851, 859, 864
See application file for complete search history.

(56) References Cited

U.S. PATENT DOCUMENTS

| | | | |
|---|---|---|---|
| 4,027,289 A | 5/1977 | Toman | |
| 5,699,067 A | 12/1997 | Brown et al. | |
| 6,898,522 B2 | 5/2005 | Buth et al. | |
| 6,940,530 B2 | 9/2005 | Chen et al. | |
| 6,985,837 B2 | 1/2006 | Moon et al. | |
| 7,454,439 B1 | 11/2008 | Gansner et al. | |
| 2005/0114354 A1 | 5/2005 | Singh et al. | |
| 2008/0307498 A1 | 12/2008 | Johnson et al. | |
| 2009/0198767 A1* | 8/2009 | Jakobson et al. | 709/203 |
| 2010/0095231 A1* | 4/2010 | Marlow | 715/764 |
| 2011/0131500 A1* | 6/2011 | Ohazama | 715/738 |
| 2011/0214050 A1* | 9/2011 | Stambaugh | 715/234 |

* cited by examiner

*Primary Examiner* — Weilun Lo
*Assistant Examiner* — Truc Chuong
(74) *Attorney, Agent, or Firm* — Ronald E. Prass, Jr.; Prass LLP

(57) ABSTRACT

A method and corresponding apparatus provide a tiled map and display object layer over a network. The method includes receiving at an application server a request for a map and a request for display objects from at least one data stream available over the network, the display objects to be displayed on the map on a user computerized device, sending a request for the requested map from the application server over the network to a mapping server, receiving at the application server the requested map as a tiled map layer, sending over the network a request to the one or more data streams for the requested display objects, receiving at the application server locations of the requested display objects, combining the tiled map layer and the requested display objects into a tiled map and display object layer, and sending the tiled map and display object layer to the user computerized device.

8 Claims, 4 Drawing Sheets

METHOD AND APPARATUS FOR PROVIDING A TILED MAP AND DISPLAY OBJECT LAYER OVER A NETWORK

BACKGROUND

1. Field of the Disclosure

The disclosure relates to a method and apparatus for providing a tiled map and display object layer over a network.

2. Introduction

In mapping services available over a network such as the Internet, a user may request over the network a map of a particular geographical location. The request may be forwarded to a mapping server, which will send a map to the user's computer, which may be a laptop or desktop computer, a handheld computer, a cell phone, or another computerized device, where the map may be displayed to the user. Numerous commercial services offer such maps, including Google Maps, Yahoo! Maps, MSN Virtual Earth, and others.

Several of these mapping services have developed mapping APIs (application programming interfaces) which allow additional functionality to be added to the maps. For example, a user may add items of interest to the map, such as push pins pointing to a particular location, or icons illustrating the location of an item on the map. Typically the map itself is sent to the user in what is known as a tile layer, and items added are sent as individual objects, which are overlayed over the tile layer. If a large number of such objects are sent to the users computer, they may overwhelm the memory of the computer, and may not display correctly, particularly if the user is trying to repeatedly view such a map with a large number of objects that are changing their location.

SUMMARY

A method and corresponding apparatus for providing a tiled map and display object layer over a network. The method includes receiving at an application server a request for a map and a request for display objects from at least one data stream available over the network, the display objects to be displayed on the map on a user computerized device, sending a request for the requested map from the application server over the network to a mapping server, receiving at the application server the requested map as a tiled map layer, sending over the network a request to the one or more data streams for the requested display objects, receiving at the application server locations of the requested display objects, combining the tiled map layer and the requested display objects into a tiled map and display object layer, and sending the tiled map and display object layer to the user computerized device.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
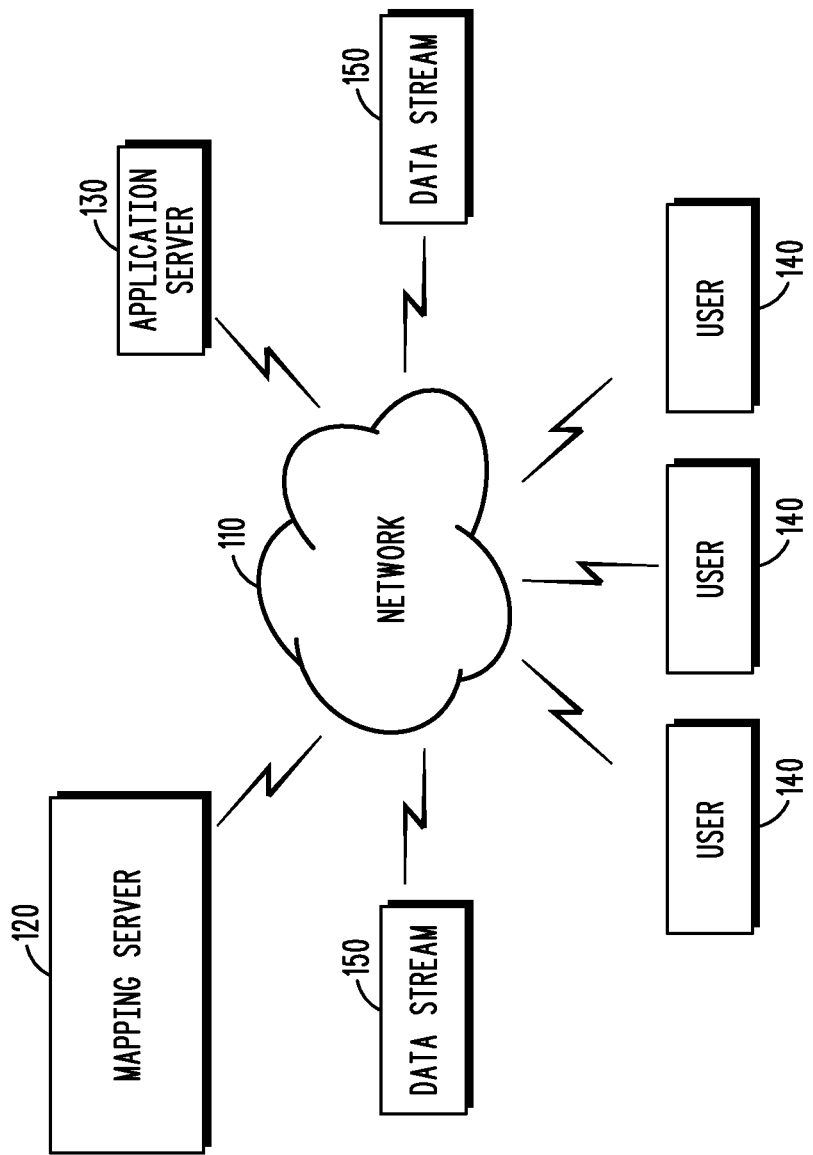
FIG. 1 illustrates an exemplary diagram of a network environment in accordance with a possible embodiment of the disclosure.

FIG. 1 illustrates an exemplary diagram of a network environment 100 in accordance with embodiments of the disclosure. The network environment 100 may include a plurality of computerized user devices 140, a mapping server 120, an application server 130, and data streams 150, all connected to a network 110.

Network 110 may represent any network that may handle transmission of large amounts of data, including wireless telephone networks, hardwired telephone networks, wireless local area networks (WLAN), the Internet, an intranet, and the like, for example.

The computerized user devices 140 may represent any electronic device capable of receiving and displaying electronic data, including a telephone, a laptop computer, a desktop computer, a handheld computer, and the like, for example. The computerized user devices 140 will contain typical computer components, including a display, a user interface, a processor, memory, etc. Although only three computerized user devices 140 are shown, this is merely illustrative. There may be any number of computerized user devices 140 in the network environment 100.

The mapping server 120 may be a typical mapping server such as those utilized by Google Maps, Yahoo! Maps, MSN Virtual Earth, and others. The mapping server 120 may provide maps on request, as further discussed below.

The application server 130 may interface with any of the computerized user devices 140, the mapping server 120 and the data streams 150. Further details of the application server 130 are discussed in connection with FIG. 2

Figure 2:
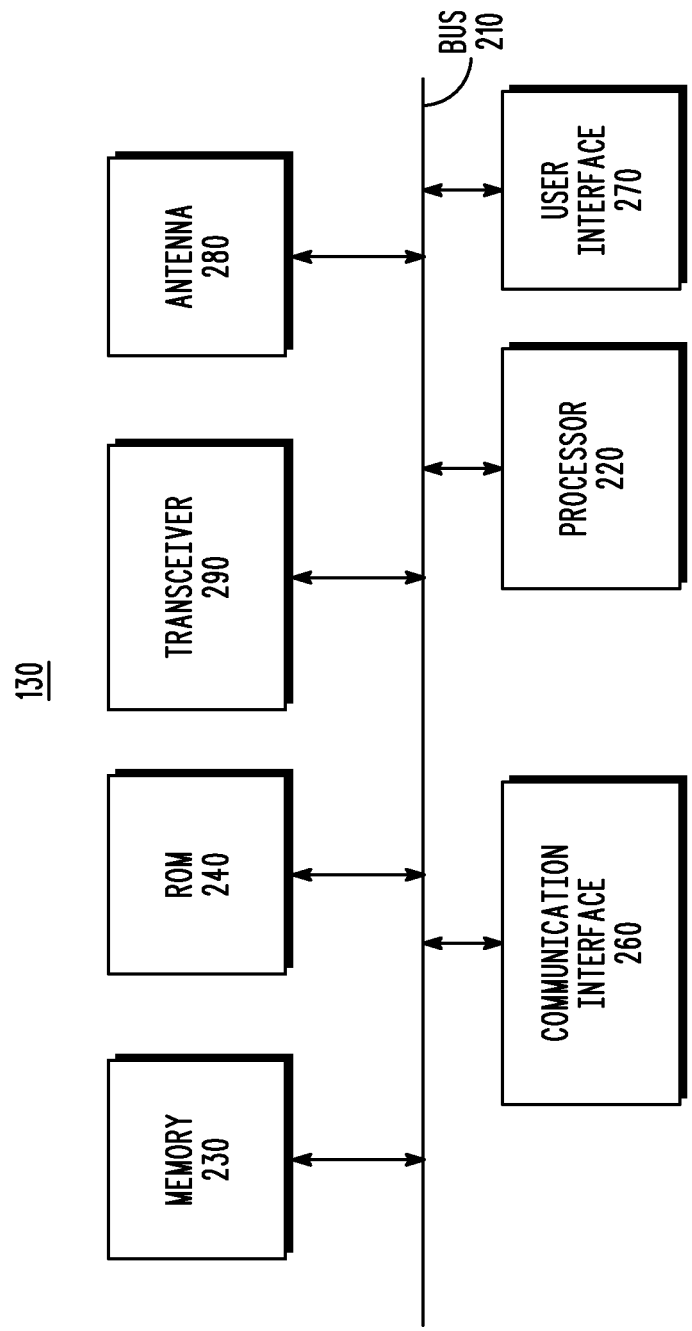
FIG. 2 illustrates a block diagram of an exemplary of an application server in accordance with a possible embodiment of the disclosure.

FIG. 2 illustrates a block diagram of an exemplary application server 130 in accordance with a possible embodiment of the disclosure. The exemplary application server 130 may include a bus 210, a processor 220, a memory 230, a transceiver 250, a communication interface 260, a user interface 270, and an antenna 280. Bus 210 may permit communication among the components of the application server 130.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Transceiver 250 may include one or more transmitters and receivers. The transceiver 250 may include sufficient functionality to interface with any network or communications station and may be defined by hardware or software in any manner known to one of skill in the art. The processor 220 is cooperatively operable with the transceiver 250 to support operations within the network 110. The transceiver 250 may transmit and receive transmissions directly or wirelessly via one or more of antenna 280, for example, in a manner known to those of skill in the art.

Communication interface 260 may include any mechanism that facilitates communication via the network 110. For example, communication interface 260 may include a modem. Alternatively, communication interface 260 may include other mechanisms for assisting the transceiver 250 in communicating with other devices and/or systems via wireless or hardwired connections.

User interface 270 may include one or more conventional input mechanisms that permit a user to input information, communicate with the application server 130 and/or present information to a user, such as a an electronic display, microphone, touchpad, keypad, keyboard, mouse, pen, stylus, voice recognition device, buttons, one or more speakers, etc.

The application server 130 may perform such functions in response to processor 220 and by executing sequences of instructions contained in a computer-readable medium, such as, for example, memory 230. Such instructions may be read into memory 230 from another computer-readable medium, such as a storage device or from a separate device via communication interface 260.

Embodiments of the invention utilize mapping servers, which are designed to send a map to the user's computer, which may be a laptop or desktop computer, a handheld computer, a cell phone, or another computerized device, where the map may be displayed to the user. Some of the available mapping servers allow the user to not only display a map, but to have other functionality, such as embedding the map in a user website and adding user selected data points, through the use of an API (application programming interface). The user may select a geographical area to display, select a zoom level, and the map may be generated and sent for display to the user.

The mapping servers may utilize Hyper-Text Markup Language (HTML), Dynamic HTML, Java Server Pages JSP), JavaScript or the like to display the maps. Java Servlets may also be utilized.

Typically, the mapping servers utilize a map that consists of a set of tiles, which may cover the entire surface of the earth, at different zoom levels. At a lowest zoom level, one tile may represent the entire earth. Each succeeding zoom level may divide the map into $4^N$ tiles, where N refers to the zoom level. A plurality of tiles may be displayed side by side to illustrate a larger geographical area as the zoom level increases. The maps may typically include roads, cities and towns, and other items that may increase in detail as the zoom level increases.

Mapping servers may provide map tiles with display objects over-laid on top of the tile. The display objects (also known as objects) are typically tied to latitude/longitude coordinates so that they move when the map is dragged or zoomed. The display objects may include markers that identify a point on the map, icons (which typically contain a foreground image and a background image), polylines (a linear overlay), polygons (a series of points in an ordered sequence), information windows, and so forth.

Typically, the mapping server will provide the map tile and separately provide the display objects, and the user's computerized device will need to display the map tile and display the display objects. If a large number of display objects are requested, the memory and/or processor of the user computer may be overwhelmed, making display of the map and display objects difficult. This problem becomes worse if the objects are being provided in a data stream where the objects change position with time, and the display device is required to repeatedly display the map with a large number of display objects that are changing position in an animated fashion.

Display objects may be requested from a source different than the mapping server. The same problems of displaying a large number of display objects over one or more map tiles as discussed above may be encountered when display objects are requested from a data stream separate from the mapping server. This problem will typically get worse as the number of display objects increase, particularly when the number of display objects increases to over 100 display objects or when the display objects are changing position with time are are displayed in an animated fashion.

Figure 3:
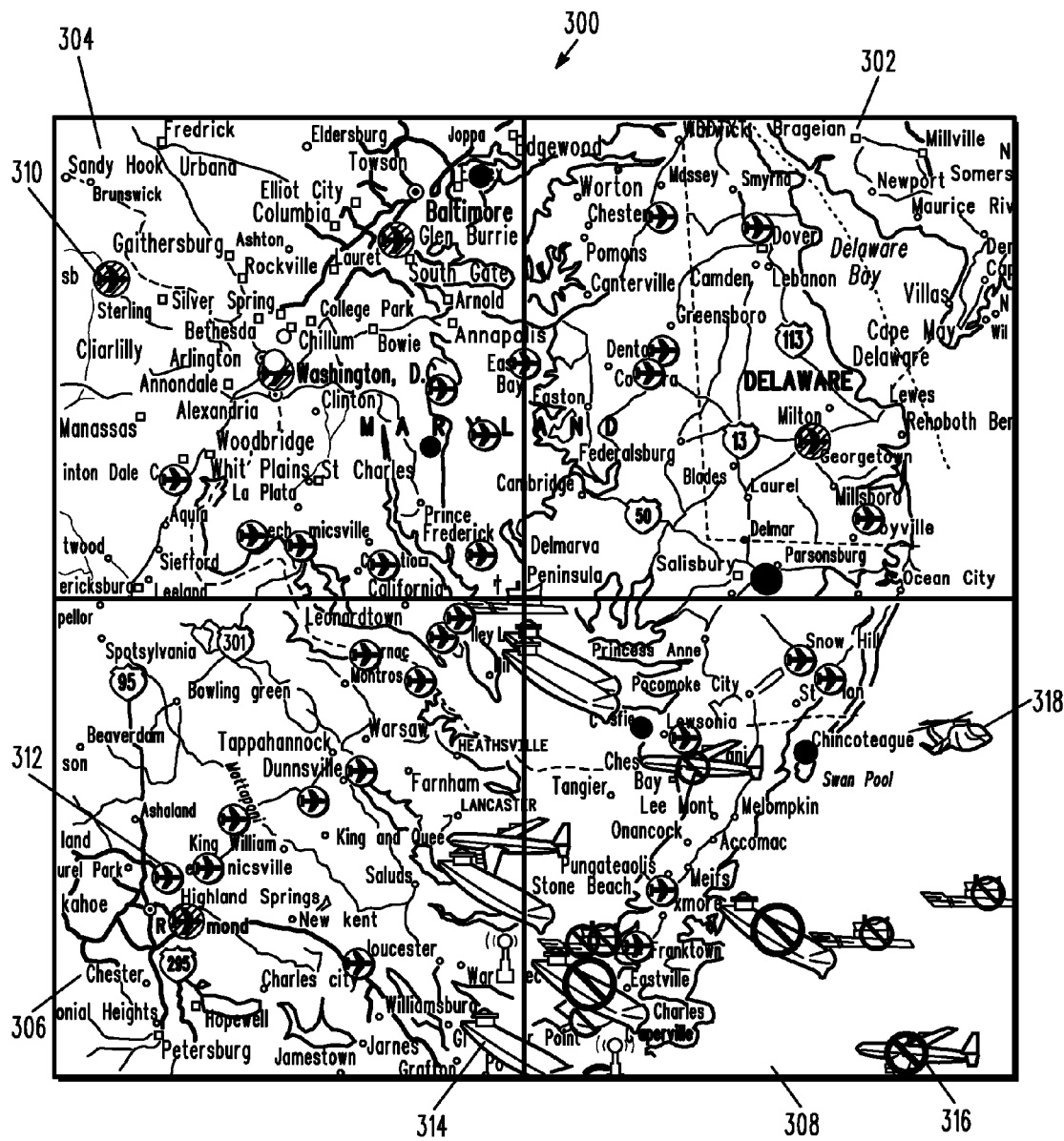
FIG. 3 illustrates an exemplary block diagram of a tiled map and display object layer in accordance with a possible embodiment of the disclosure.

FIG. 3 illustrates a map 300 that may be displayed on a user device in accordance with embodiments of the invention. The map 300 includes tiles 302, 304, 306 and 308 each displaying a geographical area. The tiles 302, 304, 306 and 308 shown in this example display the Washington, D.C., Delaware and Richmond areas. The tiles 302, 304, 306 and 308 include names of cities and towns, as well as major roads.

When a user requests a map and data from one or more data streams 150, the request may be directed to application server 130. The user device 140 may be connected to the application server 130 to provide map tiles with a large number of display objects, and to provide the ability to animate the maps and display objects. When the user device 140 requests a map and display objects (which may be from a data stream), the request may be directed to the application server 130. The request may indicate which map server the map should come from and where the display objects should come from.

The application server 130 may then direct a request over network 110 to the mapping server 120 for the requested map, which is sent from the mapping server 120 to the application server 130, in the form of one or more map tiles in a tile layer. The request from the user device 140 may also indicate where the display objects should come from, such as from data streams 150, from mapping server 120, or a combination thereof. The application server 130 then sends a request to the data streams 150 and/or to the mapping server 120 for a location of each of the display objects. The request will typically include an indication of which objects are requested, as well as an indication of a time interval for display objects that are to be sent repeatedly, such as display objects that are changing position with time.

When the display objects are changing position with time, embodiments of the invention will receive display objects each with a series of corresponding positions (such as latitude and longitude) and corresponding time points, where at least some of the corresponding positions may be changing with time. The display objects may come from one or a plurality of data streams.

Referring again to FIG. 3, display objects 310, 312, 314, 316 and 318 are illustrated. Display object 310 in the form of an icon illustrates the location of an airport, and other display objects with the same icon illustrate the location of other airports. The display objects illustrating the location of airports do no change position with time. Display object 312 in the form of an icon illustrates the location of an airplane in the air at a particular point in time, and other display objects with the same icon illustrate other airplanes in the air at the same point in time.

Display object 314 in the form of an icon illustrates the location of a ship at a particular point in time, and other display objects with the same icon illustrate other ships at the same point in time. Display object 316 in the form of an icon illustrates the location of an airplane in the air at a particular point in time, and other display objects with the same icon illustrate other airplane in the air at the same point in time. Display object 316 and display object 312 both illustrate an airplane in the air at a particular point in time, but have different icons to illustrate that they come from different data streams 150.

Display object 318 in the form of an icon illustrates the location of a helicopter in the air at a particular point in time. The data used to generate each of the display objects 312, 314, 316 and 318 may come from a different data stream 150. The data streams 150 could provide any kind of data that includes the location of objects that may be displayed on a map, and may be especially useful where the location of the objects changes with time. The examples in FIG. 3 include the locations of airplanes, helicopters and ships, all of which may have locations changing with time. The invention could be used to display the location of all buses, of trains, of cars, of traffic jams, of accidents, or of other items in a city or other location or locations that may be displayed on a map, for example.

Embodiments of the invention may a tiled map layer from a mapping server and receive locations of requested display objects, as well as display objects which may be in the form of an icon or the like. The tiled map layer and the display objects may be combined into a tiled map and display object layer. The tiled map and display object layer may be easily displayed by a computerized user device because the display objects have been combined with the map into the tiled map and display object layer, even when a series of the tiled map and display object layers are displayed with display objects having changing locations so as to provide animation.

Figure 4:
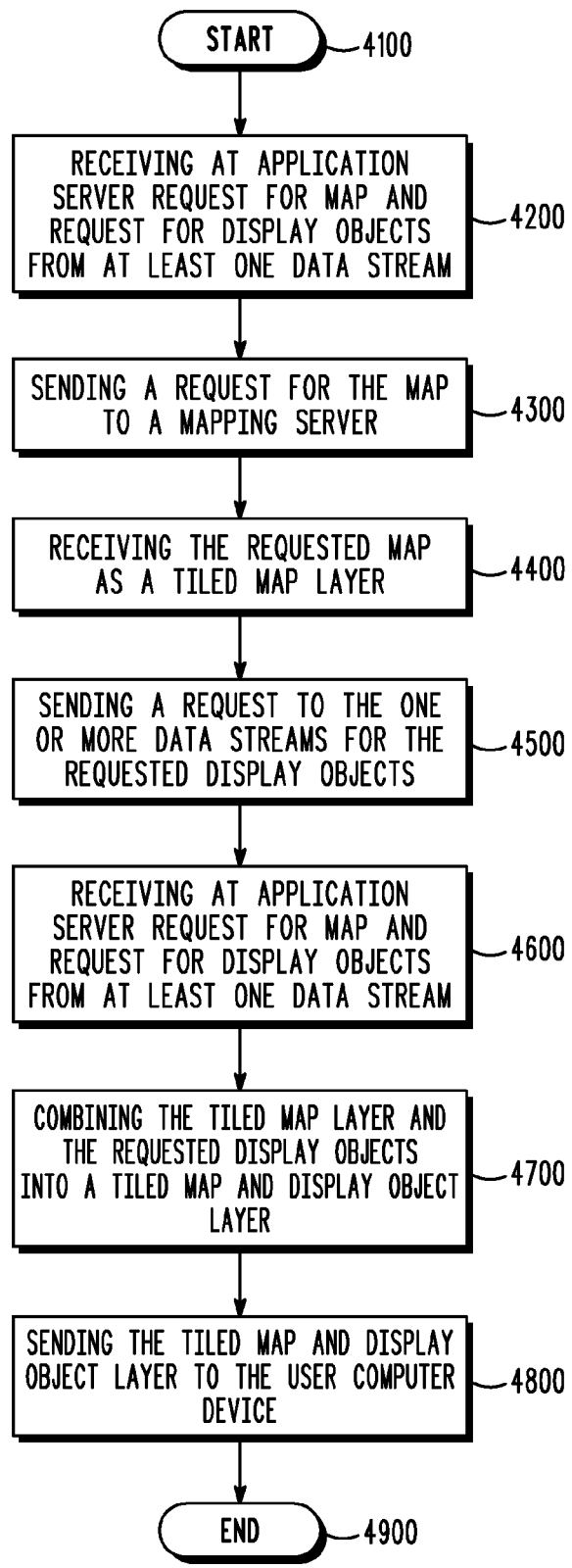
FIG. 4 is an exemplary flowchart illustrating a process in accordance with a possible embodiment of the disclosure.

FIG. 4 is an exemplary flowchart illustrating a possible process in accordance with embodiments of the disclosure. The process begins at step 4100.

In 4200, a request is received at the application server for a map and a request for display objects from at least one data stream available over the network, the display objects to be displayed on the map on a user computerized device.

In 4300, a request for the requested map is sent from the application server over the network to a mapping server. In 4400, the requested map is received at the application server as a tiled map layer.

In 4500, a request to the one or more data streams is sent over the network for the requested display objects. In 4600, locations of the requested display objects are received at the application server.

In 4700, the tiled map layer and the requested display objects are combined into a tiled map and display object layer. In 4800, the tiled map and display object layer are sent to the user computerized device. In 4900, the process ends.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. Accordingly, the appended claims and their legal equivalents should only define the disclosure, rather than any specific examples given.

We claim:

1. A method for providing a combined tiled map and display object layer over a network, comprising:

receiving at an application server a request for a map and a request for display objects from at least one data stream available over the network, the display objects to be displayed in conjunction with a display of the map on a user computerized device;

sending a request for the requested map from the application server over the network to a mapping server;

receiving at the application server the requested map as a tiled map layer;

sending over the network a request to the one or more data streams for the requested display objects;

receiving at the application server locations of the requested display objects;

receiving from the data stream a time each display object is at the corresponding location;

receiving a stream of data from the one or more data streams, the stream of data including a series of locations of each of the display objects, and a corresponding series of times each of the display objects is at the corresponding locations;

combining the tiled map layer and the requested display objects at the application server to generate a combined tiled map and display object layer;

forming at the application server a series of combined tiled map and display object layers from the tiled map layer and the stream of data; and sending the series of combined tiled map and display object layer from the application server to the user computerized device to be displayed on the user computerized device as an animation.

2. The method of claim 1, wherein the one or more data streams comprise a plurality of data streams.

3. The method of claim 2, wherein the plurality of data streams all provide different display object locations.

4. A non-transitory computer-readable medium storing instructions which, when executed by a computer, cause the computer to execute a method for providing a tiled map and display object layer over a network, the method comprising:

receiving at an application server a request for a map and a request for display objects from at least one data stream available over the network, the display objects to be displayed in conjunction with a display of the map on a user computerized device;

sending a request for the requested map from the application server over the network to a mapping server;

receiving at the application server the requested map as a tiled map layer;

sending over the network a request to the one or more data streams for the requested display objects;

receiving at the application server locations of the requested display objects;

receiving from the data stream a time each display object is at the corresponding location;

receiving a stream of data from the one or more data streams, the stream of data including a series of locations of each of the display objects, and a corresponding series of times each of the display objects is at the corresponding locations;

combining the tiled map layer and the requested display objects at the application server to generate a combined tiled map and display object layer;

forming at the application server a series of combined tiled map and display object layers from the tiled map layer and the stream of data; and sending the series of combined tiled map and display object layer from the application server to the user computerized device to be displayed on the user computerized device to be displayed as an animation.

5. The non-transitory computer-readable medium of claim 4, wherein the one or more data streams comprise a plurality of data streams.

6. The non-transitory computer-readable medium of claim 5, wherein the plurality of data streams all provide different display object locations.

7. An apparatus, comprising:

a memory for storing instructions;

a processor for executing the stored instructions to provide a combined tiled map and display object layer over a network, the processor being programmed to:

receive, from a user computerized device, a request for a map and a request for display objects from at least one data stream available over the network, the display objects to be displayed in conjunction with a display of the map on the user computerized device;

send a request for the requested map over the network to a mapping server;

receive the requested map as a tiled map layer;

send over the network a request to the one or more data streams for the requested display objects;

receive locations of the requested display objects;

receive from the data stream a time each display object is at the corresponding location;

receive a stream of data from the one or more data streams, the stream of data including a series of locations of each of the display objects, and a corresponding series of times each of the display objects is at the corresponding locations;

combine the tiled map layer and the requested display objects at application server to generate a combined tiled map and display object layer;

form a series of combined tiled map and display object layers from the tiled map layer and the stream of data; and send the series of combined tiled map and display object layer to the user computerized device to be displayed on the user computerized to be displayed as an animation.

8. The apparatus controller of claim 7, the one or more data streams comprising a plurality of data streams and the plurality of data streams all providing different display object locations.

* * * * *